United States Patent Office 2,809,972
Patented Oct. 15, 1957

2,809,972

1,1,2,2-TETRACYANOETHANESULFONIC ACID AND SALTS THEREOF

William Joseph Middleton, Claymont, Del., assignor to E. I. du Pont de Nemours and Company, Wilmington, Del., a corporation of Delaware No Drawing. Application April 26, 1956, Serial No. 580,724

10 Claims. (Cl. 260—270)

This invention relates to a new dibasic organic acid and its salts and methods for their preparation, and is more particularly concerned with the new compounds, 1,1,2,2-tetracyanoethanesulfonic acid and its salts, and their preparation.

Tetracyanoethylene has been prepared by the reaction of sulfur monochloride with malononitrile, conveniently in the presence of a liquid diluent, and thereafter separating the tetracyanoethylene from the reaction mixture. This represents a practical method for the preparation of tetracyanoethylene, and it is particularly useful in preparing tetracyanoethylene for uses in which a high state of purity is not essential. The reaction of malononitrile with sulfur monochloride gives sulfur as a by-product. This sulfur and small amounts of tar-like residues, which are always formed in this process, have been rigorously separated from tetracyanoethylene only by an elaborate purification treatment, such as by sumlimation through a bed of activated carbon. For the preparation of highly purified tetracyanoethylene, such a process is understandably uneconomical.

It is an object of this invention to prepare useful sulfonates from tetracyanoethylene. Another object is to provide new sulfonic acid and sulfonic acid salts derived from tetracyanoethylene. A further object is to provide such derivatives which are suitable for use in purifying tetracyanoethylene. Other objects will become apparent from the specification and claims.

There has now been discovered the process of reacting tetracyanoethylene with an aqueous sulfite solution which yields a 1,1,2,2-tetracyanoethanesulfonic acid and its salts. Thus, when tetracyanoethylene is reacted with aqueous sulfurous acid (sulfur dioxide in water), the product is 1,1,2,2-tetracyanoethanesulfonic acid. When tetracyanoethylene reacts with an aqueous bisulfite solution, there is obtained an acid salt of 1,1,2,2-tetracyanoethanesulfonic acid with the cation of the starting bisulfite. And, when tetracyanoethylene reacts with an aqueous sulfite solution, there is obtained a normal salt of 1,1,2,2-tetracyanoethanesulfonic acid with the cation of the starting sulfite. The acid and normal salts of 1,1,2,2-tetracyanoethanesulfonic acid may also be prepared from the free acid by neutralization with a base or from one another by metathesis.

By treatment of this new dibasic acid or its salts with aqueous solutions of nitric acid, at an acid concentration of at least 1%, by weight, tetracyanoethylene is regenerated. Accordingly, this invention makes available a process for separating tetracyanoethylene from water-insoluble impurities by converting tetracyanoethylene to the soluble 1,1,2,2-tetracyanoethanesulfonic acid or one of its salts, filtering off the impurities, treating the aqueous solution with nitric acid to regenerate tetracyanoethylene as a precipitate, and separating the precipitate from the aqueous solution by filtration. In the regeneration of tetracyanoethylene, sulfuric acid or the corresponding sulfate salts are also formed. When these are soluble they are removed with the aqueous solution and by washing the precipitate. When the sulfate salts are insoluble and precipitate with the tetracyanoethylene, they can be separated from it by dissolving the tetracyanoethylene in acetone, filtering, and evaporating the filtrate.

In a preferred embodiment of this invention tetracyanoethylene is suspended in water and sulfur dioxide gas is bubbled into the mixture until all the tetracyanoethylene is converted to 1,1,2,2-tetracyanoethanesulfonic acid in solution. Alternatively, tetracyanoethylene is treated with aqueous solutions of sodium bisulfite or sodium sulfite to yield, respectively, monosodium 1,1,2,2-tetracyanoethanesulfonate or disodium 1,1,2,2-tetracyanoethanesulfonate.

In metathetical reactions between salts of 1,1,2,2-tetracyanoethanesulfonic acid and other salts, either acid or normal salts of 1,1,2,2-tetracyanoethanesulfonic acid can be precipitated from solution. The salt obtained depends both on the relative solubilities of the respective acid and normal salts and also upon the pH of the solution from which the salt is precipitated. Low pH generally favors the precipitation of acid salts, and higher pH (i. e., above 7) favors precipitation of normal salts.

One or both of the two hydrogens in 1,1,2,2-tetracyanoethanesulfonic acid can be replaced by cations in the formation of salts. The hydrogen of the sulfonic acid group is the more acidic and, therefore, is the one which is replaced in the acid salts. In the normal salts both the hydrogen of the sulfonic acid group and the hydrogen attached to the 2-carbon of the ethane group are replaced by cations.

In the following examples, which illustrate specific embodiments of the invention, parts are by weight.

EXAMPLE I

*1,1,2,2-tetracyanoethanesulfonic acid*

A suspension of 64 parts of tetracyanoethylene in 250 parts of water is saturated with sulfur dioxide until solution is complete. There is obtained 1,1,2,2-tetracyanoethanesulfonic acid in aqueous solution. Evaporation of the water at room temperature reverses the reaction by which the acid is formed, giving 51 parts (80% recovery) of tetracyanoethylene.

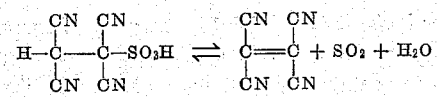

The acid is hydrolyzed to tetracyanoethane by heating the aqueous solution. Thus when the water is removed from the above solution of 1,1,2,2-tetracyanoethanesulfonic acid by boiling the solution, tetracyanoethane is formed as follows:

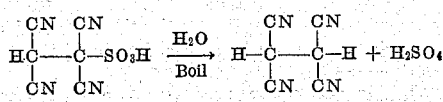

When the aqueous solution is treated with nitric acid, tetracyanoethylene and sulfuric acid are obtained. However, 1,1,2,2-tetracyanoethanesulfonic acid is readily isolated in the form of its salts as shown in subsequent examples.

EXAMPLE II

*Tetramethylammonium 1,1,2,2-tetracyanoethanesulfonate*

A suspension of 256 parts of tetracyanoethylene in 1000 parts of water is saturated with sulfur dioxide until solution is complete. The resulting solution of 1,1,2,2-tetracyanoethanesulfonic acid is filtered and the filtrate is mixed with a solution of 206 parts of tetramethylammonium chloride in 750 parts of water. The white precipitate which forms is collected on a filter, washed with water and dried. There is obtained 520 parts (95% yield) of tetramethylammonium 1,1,2,2-tetracyanoethanesulfonate in the form of a white crystalline powder, M. P. 116–118° C. with decomposition. A sample is recrystallized from methanol-water to give long white needles, M. P. 120–122° C. with decomposition.

*Analysis.*—Calcd. for $C_{10}H_{13}N_5SO_3$: C, 42.39; H, 4.62; N, 24.72; S, 11.31; neut. equiv., 283.3. Found: C, 42.50; H, 4.72; N, 24.45; S, 11.50; neut. equiv. 285; $pK_a$, 2.70.

EXAMPLE III

*Tetraethylammonium 1,1,2,2-tetracyanoethanesulfonate*

A suspension of 100 parts of tetracyanoethylene in 500 parts of water is saturated with sulfur dioxide until solution is complete. The solution is filtered and the filtrate is mixed with a solution of 170 parts of tetraethylammonium bromide in 500 parts of water. The white precipitate which forms is collected on a filter, washed with water and recrystallized from methanol-water. There is obtained 189 parts (70% yield) of tetraethylammonium 1,1,2,2-tetracyanoethanesulfonate in the form of white needles, M. P. 98–100° C. with decomposition.

*Analysis*—Calcd. for $C_{14}H_{21}N_5SO_3$: C, 49.54; H, 6.24; N, 20.63; S, 9.44; neut. equiv., 339.4. Found: C, 49.83; H, 6.32; N, 20.62; S, 9.45; neut. equiv. 338 $pK_a$, 2.62.

EXAMPLE IV

*Trimethylsulfonium 1,1,2,2-tetracyanoethanesulfonate*

A suspension of 10 parts of tetracyanoethylene in 50 parts of water is saturated with sulfur dioxide until solution is complete. The solution is filtered to remove small traces of undissolved material and the filtrate is mixed with 16 parts of trimethylsulfonium iodide in 50 parts of water. The crystals which separate are collected on a filter, washed with water and dried. There is obtained 24 parts of trimethylsulfonium 1,1,2,2-tetracyanoethanesulfonate in the form of white needles, M. P. 84–85° C. with decomposition. This product dissolves in 5% sodium bicarbonate solution with evolution of carbon dioxide and is reprecipitated by acidification with 5% hydrochloric acid.

*Analysis.*—Calcd. for $C_9H_{10}N_4S_2O_3$: C, 37.75; H, 3.52; N, 19.57; S, 22.40. Found: C, 38.06; H, 3.74; N, 19.62; S, 22.43.

EXAMPLE V

*N-methylquinolinium 1,1,2,2-tetracyanoethanesulfonate*

Sulfur dioxide is passed into a suspension of 64 parts of tetracyanoethylene in 500 parts of water until solution is complete. The solution is filtered and the filtrate is mixed with a solution of 270 parts of N-methylquinolinium iodide in 1000 parts of water. The yellow precipitate which forms is collected on a filter and washed with water. There is obtained 170 parts (96% yield, based on N-methylquinolinium iodide) of N-methylquinolinium 1,1,2,2-tetracyanoethanesulfonate in the form of a light yellow powder. A sample is recrystallized from water to give white needles, M. P. 85–86° C.

*Analysis.*—Calcd. for $C_{16}H_{11}N_5SO_3$: C, 54.38; H, 3.14; N, 19.82; S, 9.07. Found: C, 54.57; H, 3.16; N, 19.66; S, 9.19.

EXAMPLE VI

*Sodium 1,1,2,2-tetracyanoethanesulfonate*

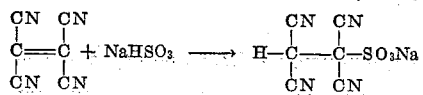

Freshly sublimed powdered tetracyanoethylene (128 parts) is dissolved in a solution of 104 parts of sodium bisulfite in 500 parts of water. A small amount of undissolved material is removed by filtration and the filtrate is evaporated to dryness under a stream of nitrogen at room temperature. The brown residue is triturated with alcohol, collected on a filter and washed with alcohol. The solid is dissolved in acetone, treated with decolorizing carbon and filtered. The filtrate is drowned in ether. White crystals separate upon standing. These crystals are recrystallized from acetone-ether. There is obtained 20 parts of sodium 1,1,2,2-tetracyanoethanesulfonate in the form of a white crystalline solid which darkens at about 180° C. without melting.

*Analysis.*—Calcd. for $C_6HN_4SO_3Na$: C, 31.03; H, 0.44; N, 24.13; S, 13.81; Na, 9.91. Found: C, 31.10, 31.40; H, 0.53, 0.56; N, 24.41, 24.37; S, 13.69, 13.75; N, 11.3.

EXAMPLE VII

*Bis(trimethylbenzylammonium) salt of 1,1,2,2-tetracyanoethanesulfonic acid*

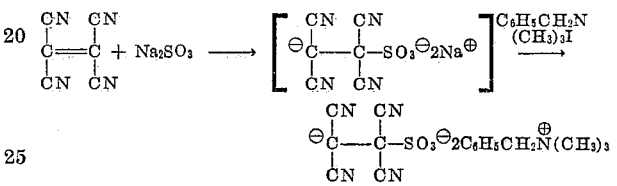

Finely powdered tetracyanoethylene (64 parts) is dissolved in a solution of 126 parts of sodium sulfite in 500 parts of water. The resulting solution of the disodium salt of 1,1,2,2-tetracyaneoethanesulfonic acid is mixed with a solution of 270 parts of trimethylbenzylammonium iodide and 500 parts of water. The white precipitate which forms is collected on a filter, washed with water and dried. There is obtained 225 parts (89% yield) of the bis(trimethylbenzylammonium) salt of 1,1,2,2-tetracyanoethanesulfonic acid in the form of a light yellow powder, M. P. 197–198° C. A sample is recrystallized from water to give white needles, M. P. 198–199° C.

*Analysis.*—Calcd. for $C_{26}H_{32}N_6SO_3$: C, 61.39; H, 6.34; N, 16.52; S, 6.30. Found: C, 61.18; H, 6.49; N, 16.52, 16.40; S, 6.41, 6.22.

This same salt is also obtained by substituting potassium metabisulfite or sodium bisulfite for the sodium sulfite in the above example.

EXAMPLE VIII

*Bis(N-methylquinolinium) salt of 1,1,2,2-tetracyanoethanesulfonic acid*

A solution prepared by dissolving 128 parts of tetracyanoethylene and 208 parts of sodium bisulfite in 1000 parts of water is mixed with a solution of 270 parts of N-methylquinolinium iodide in 1000 parts of water. The yellow precipitate which forms is collected on a filter, washed with water and dried. There is obtained 246 parts (99% yield) of crude yellow product. A sample is recrystallized from water to give the bis(N-methylquionlinium) salt of 1,1,2,2-tetracyanoethanesulfonic acid in the form of light yellow needles, M. P. 125–150° C. with decomposition.

*Analysis.*—Calcd. for $C_{26}H_{20}N_6SO_3$: C, 62.89; H, 4.06; N, 16.93; S, 6.46. Found: C, 62.72; H, 4.00; N, 17.04; S, 6.75.

EXAMPLE IX

*Bis(N-methyllepidinium) salt of 1,1,2,2-tetracyanoethanesulfonic acid*

A finely ground mixture of 128 parts of tetracyanoethylene and 312 parts of sodium bisulfite is dissolved in 1000 parts of water. The resulting solution of sodium 1,1,2,2-tetracyanoethanesulfonate is filtered and the filtrate is mixed with a solution of 570 parts of N-methyllepidinium iodide in 2000 parts of water. The yellow precipitate which forms is collected on a filter, washed with water and recrystallized from methyl alcohol. There is obtained 300 parts of the bis(N-methyllepidinium)

salt of 1,1,2,2-tetracyanoethanesulfonic acid in the form of orange needles, M. P. 172–173° C. with decomposition starting at 135° C.

*Analysis.*—Calcd. for $C_{28}H_{24}N_6SO_3$: C, 64.10; H, 4.61; N, 16.02; S, 6.11. Found: C, 64.00; H. 467; N, 15.51; S, 6.26.

EXAMPLE X

*Silver salt of tetramethylammonium 1,1,2,2-tetracyanoethanesulfonate*

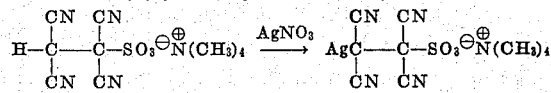

A solution of 185 parts of tetramethylammonium 1,1,2,2-tetracyanoethanesulfonate in 1190 parts of acetone is mixed with a solution of 120 parts of silver nitrate in 392 parts of acetonitrile. The white crystalline precipitate which forms is collected on a filter and washed thoroughly with acetone. There is obtained 152 parts of the silver salt of tetramethylammonium 1,1,2,2-tetracyanoethanesulfonate in the form of a white crystalline powder which slowly decomposes when heated above 100° C.

*Analysis.*—Calcd. for $C_{10}H_{12}N_5SO_3Ag$: C, 30.78; H, 3.10; N, 17.95; S, 8.21; Ag, 27.65. Found: C, 31.28; H, 3.34; N, 17.77; S, 7.64; Ag, 27.81.

EXAMPLE XI

*Silver salt of N-methylquinolinium 1,1,2,2-tetracyanoethanesulfonate*

A solution of 34 parts of silver nitrate in 250 parts of water is added to a solution of 53 parts of N-methylquinolinium 1,1,2,2-tetracyanoethanesulfonate and 103 parts of 5% nitric acid in 396 parts of acetone and 500 parts of water. The light yellow precipitate which forms is collected on a filter, washed with water and then acetone. There is obtained 52 parts of the silver salt of N-methylquinolinium 1,1,2,2 - tetracyanoethanesulfonate in the form of a light yellow powder.

*Analysis.*—Calcd. for $C_{16}H_{10}N_5SO_3Ag$: C, 41.75; H, 2.19; N, 15.22; S, 6.97; Ag, 23.44. Found: C, 40.59; H, 2.03; N, 15.88; S, 6.39; Ag, 25.93.

EXAMPLE XII

*Conversion of normal salt to acid salt*

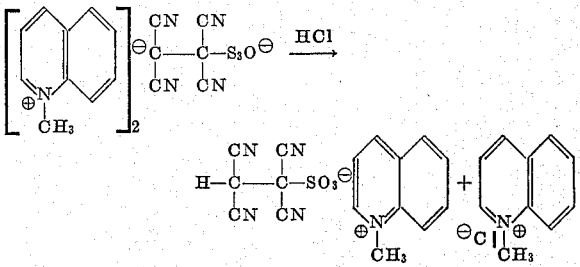

One hundred parts of the bis(N-methylquinolinium) salt of 1,1,2,2-tetracyanoethanesulfonic acid is recrystallized from a 2% hydrochloric acid solution. There is obtained 47 parts of N-methylquinolinium 1,1,2,2-tetracyanoethanesulfonate in the form of long white needles, M. P. 85–86° C. The infrared absorption spectrum of this product is identical with that of the product in Example V.

EXAMPLE XIII

*Reaction of 1,1,2,2-tetracyanoethanesulfonic acid with acetone*

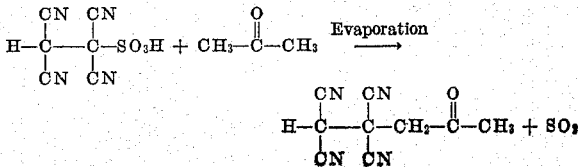

A solution of 100 parts of tetramethylammonium 1,1,2,2-tetracyanoethanesulfonate in 792 parts of acetone is passed through a column of ion exchange resin ("Amberlite IR–120H") which is in acid form and has been flushed with acetone. The acetone percolate is evaporated to dryness and the residue is collected on a filter, washed with water and recrystallized from ethyl acetate. There is obtained 81 parts of 4,4,5,5-tetracyano-2-pentanone in the form of white plates, M. P. 120–122° C. with decomposition. The identity of the material is established by comparison of its infrared spectrum with that of an authentic sample.

The examples have illustrated the reaction of tetracyanoethylene with sulfite ions in aqueous solution where the sulfite ions have been supplied from sulfurous acid or from a dissolved bisulfite or sulfite. Suitable bisulfites for this purpose include ammonium, calcium, potassium and sodium bisulfites and the like. Similarly, the sulfites of ammonium, barium, cadmium, calcium, cobalt, copper, iron, lead, lithium, magnesium, nickel, osmium, potassium, rhodium, silver, sodium, strontium, thallium, zinc and the like may be reacted with tetracyanoethylene to produce the corresponding 1,1,2,2-tetracyanoethanesulfonate salts. Salts of 1,1,2,2-tetracyanoethanesulfonic acid are also obtained by treating a solution of the free acid with a metal oxide or hydroxide and evaporating the solution to dryness to obtain the salt. The reaction of tetracyanoethylene with sulfite ions is conveniently carried out at temperatures in the range of 10–50° C., although temperatures above and below this range may be employed.

The products of this invention, 1,1,2,2-tetracyanoethanesulfonic acid and its salts, are useful for preparing purified tetracyanoethylene. Thus highly purified tetracyanoethylene is readily obtained from the salts by reaction with aqueous nitric acid in concentrations above 1% and separating the reaction products, as will be illustrated with the salt prepared in Example VII.

One hundred parts of the bis(trimethylbenzylammonium) salt of 1,1,2,2-tetracyanoethanesulfonic acid is suspended in 1000 parts of water and 710 parts of concentrated nitric acid is added slowly. An exothermic reaction ensues and a white precipitate forms. This precipitate is collected on a filter and washed with water. There is obtained 21 parts (83% yield) of tetracyanoethylene in the form of a white powder. The product is identified as tetracyanoethylene by the characteristic green color produced when a portion of it is added to a solution of anthracene in benzene.

Tetracyanoethylene is useful for conversion to polymers and copolymers with ethylenically unsaturated compounds by heating in the presence of a free radical-producing polymerization catalyst, such as an azonitrile. The high softening characteristics of tetracyanoethylene polymer make it useful as a thermoplastic insulation for coils in electric motors to permit the use of higher operating temperatures without distortion or displacement of the insulation.

Tetracyanoethylene and its polymers are ready sources of hydrogen cyanide and as such are useful as insecticides. When heated in the presence of moist alkali as in processes adaptable for fumigation, tetracyanoethylene and its polymers generate hydrogen cyanide. When deposited from suspension in an alkaline medium (pH 7 to 9) as by spraying on living plants or in insect nests, tetracyanoethylene and its polymers decompose slowly and give off hydrogen cyanide, thereby serving as insect poisons for extended periods of time.

Since many different embodiments of the invention may be made without departing from the spirit and scope thereof, it is to be understood that the invention is not limited by the specific illustrations except to the extent defined in the following claims.

What is claimed is:

1. A compound selected from the group consisting of 1,1,2,2-tetracyanoethanesulfonic acid and 1,1,2,2-tetracyanoethanesulfonate salts thereof.
2. The compound, 1,1,2,2-tetracyanoethanesulfonic acid.
3. A 1,1,2,2-tetracyanoethanesulfonate salt.
4. A normal salt of 1,1,2,2-tetracyanoethanesulfonic acid.
5. A metal 1,1,2,2-tetracyanoethanesulfonate.
6. An ammonium 1,1,2,2-tetracyanoethanesulfonate.
7. The process for preparing a compound selected from the group consisting of 1,1,2,2-tetracyanoethanesulfonic acid and 1,1,2,2-tetracyanoethanesulfonate salts thereof which comprises reacting tetracyanoethylene with an aqueous sulfite solution.
8. The process for preparing 1,1,2,2-tetracyanoethanesulfonic acid which comprises reacting tetracyanoethylene with aqueous sulfurous acid.
9. The process for preparing a 1,1,2,2-tetracyanoethanesulfonate salt which comprises reacting tetracyanoethylene with an aqueous bisulfite solution.
10. The process for preparing a normal salt of 1,1,2,2-tetracyanoethanesulfonic acid which comprises reacting tetracyanoethylene with an aqueous sulfite solution.

References Cited in the file of this patent
UNITED STATES PATENTS 2,462,406     Langkammerer _____ Feb. 22, 1949